UNITED STATES PATENT OFFICE 2,476,951

STABILIZED PHTHALOCYANINE TONERS FOR PAINTS, ENAMELS, AND LACQUERS

Earl Edson Beard, Wilmington, Del., assignor to E. I. du Pont de Nemours & Company, Wilmington, Del., a corporation of Delaware No Drawing. Application June 10, 1947, Serial No. 753,798

4 Claims. (Cl. 106—288)

This invention relates to copper-phthalocyanine pigments for liquid coating compositions, and more particularly to improved copper-phthalocyanine toners for paints, enamels and lacquers, which toners do not display the disadvantages of crystallization or flocculation.

It is an object of the present invention to produce blue phthalocyanine pigments which may be employed in liquid coating compositions without suffering from the common defects of crystal growth and flocculation. A further object is to produce such improved pigments without resort to stabilizers which affect the color value or shade of the principal color. Additional important objects of this invention will appear as the description proceeds.

Coloring matters of the phthalocyanine series, especially copper-phthalocyanine, monochloro-copper-phthalocyanine, and metal-free phthalocyanine have shades, tinctorial properties and light-fastness which would make them exceedingly valuable as pigments for paints, lacquers, lacquer-type printing compositions, etc. Yet, they have not found the widest commercial application in these fields to date on account of a certain inherent tendency of pigments of the phthalocyanine family to segregate from the liquid vehicle. Practically all compounds of the phthalocyanine series have a strong tendency to flocculate. In the language of the paint mixer, this term refers to the tendency of the pigment to settle out from the paint or lacquer, except under conditions of most turbulent agitation. Such settling out, naturally weakens the color of the coating composition, especially where there is a white diluent present, such as zinc white or titanium oxide.

Chlorine-free copper-phthalocyanine has an additional noxious tendency toward crystal growth. Crystal growth also diminishes the tinctorial value of the coating composition. But whereas a flocculated pigment can be brought back into a state of intimate dispersion by violent or turbulent agitation, as for instance by applying the lacquer through the nozzle of a spray gun, the defect introduced by crystal growth is practically irreversible. Crystal growth is especially manifest where the liquid vehicle or thinner contains solvents of an aromatic nature, for instance toluene and the xylenes.

This application is concerned primarily with coloring compositions comprising chlorine-free copper-phthalocyanine, by itself or in admixture with monochloro-copper-phthalocyanine, as principal color, and its object is therefore to overcome the tendency to flocculate inherent in the phthalocyanine compounds, and incidentally to overcome the tendency to crystal growth in the chlorine-free copper-phthalocyanine. According to my invention, these tendencies are neatly and effectively overcome by admixing with the principal color a small quantity of a tin-phthalocyanine compound. To explain the latter term, it will be recalled that tin has the capacity of entering into the phthalocyanine complex both as a divalent metal and as a tetravalent metal (Barrett et al., Jour. Chem. Soc., 1936, pp. 1722–3). When it enters as a divalent metal, the compound is stannous-phthalocyanine, corresponding in structure to copper-phthalocyanine or zinc-phthalocyanine (Dent et al., Jour. Chem. Soc., 1934, p. 1035). But when it enters as a tetravalent metal, the residual two valencies of the tin may be satisfied by halogen atoms, producing, for instance, dichloro-tin-phthalocyanine. Other anionic atoms or radicals may also be made to satisfy the residual valencies of the tin in lieu of chlorine, for instance bromine, fluorine, hydroxy radicals, etc., depending on the mode of preparation of the compound or on the history of subsequent treatments. The tetravalent tin atom may also span two phthalocyanine complexes, according to the scheme Pc=Sn=Pc, the compound in this instance being known as stannic-phthalocyanine.

Now, I find that all these various forms of tin-phthalocyanine compounds, both stannous and stannic, are effective to overcome the aforenoted drawback in connection with liquid coating compositions containing phthalocyanine compounds as the coloring material. This observation is exceedingly surprising, for there is no apparent theoretical reason for any special physical or chemical interaction between the two types of phthalocyanines, and certainly no ready explanation for the selectivity of the effect. Moreover, although dichloro-tin-phthalocyanine by itself is fugitive to light, fadeometer tests revealed no drop in tinctorial strength of the mixture, even when it contained as high as 10% by weight of the tin compound. Apparently then, the copper color in turn acts to stabilize the tin color against the action of light. Such a reciprocal cooperation and mutual protection certainly was not to be predicted on the basis of anything taught in the phthalocyanine literature.

To exert its maximum protective effect, it is naturally desirable to have the tin-phthalocyanine compound associated as intimately as possible with the particles of the copper-phthalocyanine. Such intimate association is readily obtained in the case of other auxiliary colors (incorporated for other purposes) by co-precipitation from a solvent. (See for instance Dahlen and Detrick, U. S. P. 2,192,704.) The tin-phthalocyanines, however, are not stable in sulfuric acid, the solvent that would normally be used for "acid-pasting"; coprecipitation therefore is not the best method to be applied for the purpose in question. Fortunately, I found that when the tin-phthalocyanine compound is reduced to a fine state of subdivision by the method of salt grinding (Lang and Detrick, U. S. P. 2,402,167), it may be then admixed with the finely divided principal phthalocyanine color (which in turn may have been prepared in fine state either by salt grinding or by "acid-pasting") by simply mixing the two together in any convenient manner. The two colors may be admixed in wet state or in dry form. Moreover, the two colors may be brought together for the first time by the paint mixer in the process of preparing the paint, by incorporating each in customary manner in the selected paint vehicle.

The necessary proportion of tin-phthalocyanine compound to be added differs somewhat, depending on the kind of phthalocyanine mixture employed as principal color, on the type of tin compound selected as auxiliary color, and on the results sought to obtain. For instance, in the case of substantially pure chlorine-free copper-phthalocyanine, the tendency to flocculation is very strong, and to overcome it a relatively large proportion of tin-phthalocyanine is required. Good results require about 5 to 12% of the tin compound based on the weight of the chlorine-free copper compound. In compensation, this added quantity of tin color also eliminates the tendency to crystal growth. On the other hand, if the principal color mixture contains also mono-chloro-copper-phthalocyanine, the quantity of tin compound may be considerably reduced. Thus, a compound having on the average ½ chlorine atom per molecule exists on the market. With such a product, I find that addition of dichlorotin-phthalocyanine in quantity corresponding to about 6% by weight of the semichloro-copper-phthalocyanine effectively stabilizes it both against flocculation and against crystal growth.

Without limiting this invention, the following examples will illustrate my preferred mode of operation. Parts mentioned are by weight.

Example 1

10 parts of commercial chlorine-free copper-phthalocyanine and 60 parts of dry table salt are milled together in a steel ball mill for approximately 40 hours. In a separate steel ball mill, 1 part of dichlorotin-phthalocyanine and 6 parts of dry table salt are likewise milled together for 40 hours. The milled mixtures are removed from the mills and the color components in each case are extracted by slurrying the mass in water, which may contain 1 to 2% by weight of an acid, e. g. HCl, filtering, washing acid-free and drying.

The two separate powdered products so obtained may be mixed together in a ratio of 9 parts of the chlorine-free copper-phthalocyanine to 1 part of dichlorotin-phthalocyanine, to produce a marketable coloring composition adapted for incorporation into paints, lacquers, or enamels, producing a coating composition of improved non-segregating properties. Alternatively, the two powders may be brought together in the ratio mentioned in a lacquer vehicle such as nitrocellulose, the mixing being effected in a paint mill according to standard procedure.

Example 2

600 parts of dry table salt, 94 parts of commercial semichloro-copper-phthalocyanine, and 6 parts of dichlorotin-phthalocyanine are milled together in a steel ball mill until full pigment strength is developed. The strength development is determined, by sampling the mixture in the mill, extracting the salt from the sample with water, and submitting the dried pigment residue to well-known paint tests. When full strength has been developed, the product is discharged from the mill; the salt is extracted from the pigment by slurrying with water which may contain 1% to 2% by weight of HCl; the slurry is filtered, and the filter cake is washed until essentially free of acid. The pigment may be employed as press cake, or paste, or in dry form.

Example 3

Stannous-phthalocyanine is obtained according to the process of Barrett, Dent and Linstead, in Journal of the Chemical Society, 1936, part 2, p. 1732. 1 part of this stannous-phthalocyanine is milled with 7 parts of dry table salt in a steel ball mill for 50 hours. The stannous-phthalocyanine is then water extracted until salt-free, and dried. 1 part of commercial chlorine-free copper-phthalocyanine is milled with 7 parts of dry table salt in a steel ball mill for 50 hours. The copper-phthalocyanine is then water extracted and dried. 10 parts of the stannous-phthalocyanine and 90 parts of the commercial chlorine-free copper-phthalocyanine so obtained are placed in a paint mill and thoroughly mixed in the presence of a nitrocellulose vehicle. A lacquer is obtained in this manner which on testing shows negligible flocculation and crystal growth.

Alternatively, the two powders may be mixed dry, in the ratio mentioned, to produce a marketable coloring composition for paints, lacquers, and the like. The colors may also be mixed in their aqueous press cake stages, prior to drying, to produce a marketable color paste which may be readily incorporated into the respective vehicles by the well known process of "flushing."

The modified stannous-phthalocyanine prepared by reaction of stannous chloride and metal free phthalocyanine according to Barrett, Dent and Linstead, Journal of the Chemical Society, 1936, part 2, pp. 1733–1734, may be salt milled and employed as in the above paragraph with the same results.

Example 4

Stannic-phthalocyanine (Pc=Sn=Pc) is prepared from dichlorotin-phthalocyanine and disodium phthalocyanine in equal molecular quantities by refluxing in alpha chloronaphthalene for approximately 25 hours followed by filtration at 30° C. The filter cake is washed with benzene and dried and finally washed with water to remove sodium chloride and again dried.

1 part of the stannic-phthalocyanine so obtained is placed with 8 parts of table salt in a steel ball mill and milled for approximately 60 hours. Simultaneously, 1 part of commercial chlorine-free copper-phthalocyanine is milled in a separate steel ball mill together with 8 parts of dry table salt for approximately 60 hours.

The phthalocyanine pigments are then each water extracted, until salt-free, and dried.

The two pigments may be mixed together in the ratio of 1 part stannic-phthalocyanine to 9 parts chlorine-free copper-phthalocyanine, to produce a coloring composition in substance, or they may be placed in a paint mill in the specified ratio and thoroughly mixed with a nitrocellulose vehicle. Good non-flocculating and non-crystallizing properties are observed in the lacquer so obtained.

In the above two paragraphs, the 1 part of stannic-phthalocyanine may be replaced, in each case, by 1 part of the compound obtained by condensation of stannous bromide with phthalonitrile in trichlorobenzene at 210° C. followed by filtration and drying. Similar non-flocculating and non-crystallizing properties are obtained.

*Example 5*

1 part of the condensation product of stannous fluoride and phthalonitrile (reacted in trichlorbenzene at 210° C. followed by filtration and drying) is salt-milled for approximately 60 hours in the presence of 9 parts of dry table salt. After slurrying the milled mixture for a short time in 2% hydrochloric acid at 50° C. the difluorotin-phthalocyanine is isolated by filtration, thereafter washed essentially free of acid and dried. 1 part of the salt-milled and extracted difluorotin-phthalocyanine so obtained and 9 parts of a pigmentary form of commercial chlorine-free copper-phthalocyanine, which may be obtained either by salt-milling or acid-pasting commercial chlorine-free copper-phthalocyanine, may be mixed together as in the previous examples, either in the absence or in the presence of a paint or lacquer vehicle.

*Example 6*

A mixture consisting of 5 parts of finely divided dihydroxytin-phthalocyanine (obtained by boiling the salt-milled dichlorotin-phthalocyanine in dilute ammonia followed by filtration, water washing and drying) and 95 parts of a pigmentary form of commercial chlorine-free copper-phthalocyanine (prepared as described in Example 5) is incorporated into a nitrocellulose vehicle to produce a lacquer. This lacquer possesses excellent none-crystallizing and non-flocculating properties. The two colors, in the mentioned ratio, may also be mixed in substance either dry or wet to produce marketable compositions.

In all the above examples the specified tin-phthalocyanine compound may be replaced, with beneficial results, by an equal weight of any of the following tin-phthalocyanine compounds, namely:

Dichlorotin-phthalocyanine ($Cl_2=Sn=Pc$),
Difluorotin-phthalocyanine,
Dibromotin-phthalocyanine,
Dihydroxytin-phthalocyanine, Chlorohydroxytin-phthalocyanine $\begin{pmatrix} Cl \\ \phantom{x} \searrow Sn=Pc \\ HO \end{pmatrix}$, Stannous-phthalocyanine ($Sn=Pc$),
Stannic-phthalocyanine ($Pc=Sn=Pc$), and in fact any of the phthalocyanine compounds containing tin as the central metal and indicated in the Barrett et al. article above referred to.

The improved toner mixture of this invention may be utilized in the form of powder, press cake, paste, or pulp and may be applied to advantage for any use in which aromatic solvents, thinners, or paint vehicles are employed which would otherwise promote crystal growth. These uses include paints, enamels, lacquers, etc. In these uses, the toner mixtures of this invention may be employed in full strength or may be diluted with white pigments such as zinc oxide, titanium oxide or antimony trioxide.

Although the discussion above has been concerned primarily with copper-phthalocyanine, I may add at this point that my invention may be applied with equal success to metal-free phthalocyanine. In this case, a proportion of tin-phthalocyanine compound equal to from 10 to 12% by weight of the metal-free compound will successfully protect the latter against both flocculation and crystal growth. The following example will illustrate this point further.

*Example 7*

To 90 parts of metal-free phthalocyanine which has been reduced to pigmentary form by acid pasting is added 10 parts of dichlorotin-phthalocyanine which has been previously salt-milled and water extracted as in Example 1. This pigment mixture is placed in a paint mill and thoroughly mixed in the presence of a nitrocellulose vehicle. When tested, the lacquer obtained shows superior non-flocculating and non-crystallizing properties. The two colors may likewise be mixed in substance to produce a marketable composition of matter.

It will be clear now that my invention adapts the colors of the phthalocyanine series for use in paints and lacquers without the troubles of flocculation or crystallization and without adding any assistants which would dilute or otherwise adversely affect the color value of the principal toner.

I am aware that other attempts have been made in the literature to combat the tendency of phthalocyanine colors to segregate in paint vehicles. Such an attempt is described in U. S. P. 2,327,472, wherein the formation of an aluminum benzoate lake of copper-phthalocyanine is recommended. In this proposal, however, the added agent or substratum has no color-value; it therefore dilutes or diminishes the tinctorial strength of the toner. My invention has the advantage that the auxiliary agent itself is a colored pigment and has in fact a shade which blends thoroughly with that of the principal toner, so that the color strength and shade of the latter are hardly affected.

I am also aware of U. S. P. 2,160,837 of Detrick, wherein stannous or stannic chloride is employed as a catalyst in the synthesis of copper-phthalocyanine from copper-bronze and phthalonitrile, for the purpose of reducing the reaction temperature. The patentee does not teach that any tin-phthalocyanine is formed in the reaction. But in any event, the resulting mixture would not have the improved qualities of the toners of this invention and would not fall under the scope of the subjoined claims. Thus, since Detrick employs copper-bronze, his product will be chlorine-free copper-phthalocyanine, which has a strong tendency to flocculation and crystal growth. As we have seen above, it takes a quantity of dichlorotin-phthalocyanine of from 5 to 12% by weight of the principal toner to stabilize the color against these tendencies in this instance. The quantities of tin halide, however, employed by Detrick in his specific examples fall far short from those required to produce the indicated percentage of tin-phthalocyanine in the product, under the most favorable interpretation.

In the claims below, the expression "a tin-phthalocyanine compound" shall be understood as a generic expression for the various phthalocyanine derivatives above mentioned which contain tin as the central metal, including stannous-phthalocyanine, stannic-phthalocyanine, the dihalogen tin - phthalocyanines, dihydroxytin-phthalocyanine, and all the other variations indicated in said article by Barrett et al., J. C. S., 1936, pp. 1722-3. Also, by the expressions "finely divided" and "pigmentary form" I am referring to a state of division wherein the color exhibits substantially its full tinctorial strength when employed as a pigment, as for instance in a printing ink. Such state of division, as a rule, corresponds to an average pigment particle size of between 50 and 1000 millimicrons in diameter.

I claim as my invention:

1. A coloring composition consisting essentially of chlorine-free copper-phthalocyanine as a principal color and a tin-phthalocyanine compound as an auxiliary color, both colors being in a finely divided form and the tin compound being intimately dispersed among the copper compound, the quantity of the tin color being at least 5% but not over 12% by weight of the said chlorine-free copper-phthalocyanine compound, said coloring composition being characterized by stability against flocculation when incorporated in a liquid pigmenting composition.

2. A coloring composition consisting essentially of chlorine-free copper-phthalocyanine in admixture with a quantity of dichlorotin-phthalocyanine corresponding to about 5 to 12% by weight of the chlorine-free copper-phthalocyanine, the two pigments being in finely divided state and intimately dispersed among each other, and the entire coloring composition being characterized by stability against flocculation when incorporated in a liquid coating composition.

3. A coloring composition consisting essentially of a mixture of copper-phthalocyanine and monochloro-copper-phthalocyanine, and containing further dichlorotin-phthalocyanine in quantity corresponding to about 6% by weight of the total phthalocyanine color in the mixture, the three pigments being in finely divided state and intimately dispersed among each other, and the entire coloring composition being characterized by stability against flocculation when incorporated in a liquid coating composition.

4. A coloring composition consisting essentially of chlorine-free copper-phthalocyanine in admixture with a quantity of dihydroxytin-phthalocyanine corresponding to about 5 to 12% by weight of the chlorine-free copper-phthalocyanine, the two pigments being in finely divided state and intimately dispersed among each other, and the entire coloring composition being characterized by stability against flocculation when incorporated in a liquid coating composition.

EARL EDSON BEARD.

No references cited.